US010239570B2

(12) United States Patent
Lesko (10) Patent No.: US 10,239,570 B2
(45) Date of Patent: Mar. 26, 2019

(54) DEVICE AND METHOD FOR PERFORMING TILT COMPENSATION BY ROTATING ARMS (71) Applicant: Stephen J. Lesko, Chardon, OH (US)

(72) Inventor: Stephen J. Lesko, Chardon, OH (US)

(*) Notice: Subject to any disclaimer, the term of this patent is extended or adjusted under 35 U.S.C. 154(b) by 84 days.

(21) Appl. No.: 15/602,933

(22) Filed: May 23, 2017

(65) Prior Publication Data

US 2018/0339738 A1 Nov. 29, 2018

(51) Int. Cl.
G01C 9/06 (2006.01)
G01C 9/08 (2006.01)
B25J 18/04 (2006.01)
B25J 19/00 (2006.01)
B62D 57/032 (2006.01)

(52) U.S. Cl.
CPC ............ B62D 57/032 (2013.01); B25J 18/04 (2013.01); B25J 19/002 (2013.01); G01C 9/06 (2013.01); G01C 9/08 (2013.01)

(58) Field of Classification Search
CPC .................................................. B62D 57/032
USPC ............ 318/568.16, 568.11, 568.1, 567, 560
See application file for complete search history.

(56) References Cited

U.S. PATENT DOCUMENTS 5,267,140 A * 11/1993 Ibe ........................... G01M 1/32 118/669
6,584,379 B1 * 6/2003 Mukai .................... B25J 9/1638 336/130
7,258,591 B2 8/2007 Xu et al.
8,001,837 B2 * 8/2011 Larson .................... G01M 1/12 73/462
2010/0263167 A1 10/2010 Fox
2015/0165895 A1 6/2015 Menor et al.
2017/0021881 A1 1/2017 Jacobsen et al.
2017/0021915 A1 1/2017 Vaughn et al.

FOREIGN PATENT DOCUMENTS

| CN | 103612687 A | 3/2014 |
| CN | 103701081 A | 4/2014 |
| JP | 2011140096 A | 7/2011 |
| JP | 2013517462 A | 5/2013 |
| WO | 2017024473 A1 | 2/2017 |

OTHER PUBLICATIONS

Srinath G, V. P. Haridasan; Two-wheeled self-balancing autonomous robot; Journal of Chemical and Pharmaceutical Sciences; Oct.-Dec. 2016; vol. 9 Issue 4.
Tilde—NXT balancing robot; Thursday, Jan. 20, 2011; http://chrfredelasse.blogspot.in/; date accessed May 15, 2017.

* cited by examiner

Primary Examiner — David Luo
(74) Attorney, Agent, or Firm — Renner, Otto, Boiselle & Sklar, LLP (57) ABSTRACT A tilt management device configured to perform tilt correction. The device measures a direction of tilt using a tilt sensor. Circuitry rotates connected arms to compensate for the measured tilt by modulating a center of mass of the device.

20 Claims, 4 Drawing Sheets

DEVICE AND METHOD FOR PERFORMING TILT COMPENSATION BY ROTATING ARMS

TECHNICAL FIELD

The present disclosure relates generally to robotic motion and, more particularly, to systems for compensating for robotic balance.

BACKGROUND

Significant research and development is being performed to generate robots (e.g., humanoid, quadruped, etc.) that are capable of functioning on various types of terrain. The functions that a robot is capable of fulfilling depend on its ability to traverse varying terrain (e.g., stairs, hills, sand, etc.). Robots that are unable to move without falling over risk harming people, damaging property, and damaging the robot itself.

Multiple strategies have been developed to reduce the risk of robots falling by improving the stability of robotic walking. One particular method is to adjust the trajectory of the robot in such way that the Zero Moment Point (ZMP) (i.e., the point on the ground where the moment of the bearing axis and the moment of the azimuth axis are zero) is included in the robot's support polygon. This strategy is insufficient to ensure stability under all conditions, notably on uneven terrain or where the robot may be bumped or pushed by third parties.

Another strategy for wheeled robots is to use an inverted pendulum or a gyroscope with the pivot point attached to one or more wheels rolling on the ground. If the robot leans forward, a motor spins in the same direction, matching the balance of the robot. However, gyroscopes resist changes in direction due to precession, which makes it difficult to compensate for changes in terrain.

SUMMARY

The present disclosure provides a tilt management device configured to perform tilt correction by rotating connected arms to modulate a center of mass of the device. In a preferred embodiment, the arms are rotated in opposite directions to reduce imparting forces on the tilt management device due to, e.g., angular momentum.

According to one aspect, there is provided a tilt management device having a center of mass including at least two arms, at least one actuator, a tilt sensor and circuitry. The at least two arms are configured to rotate about an axis of rotation in a plane of rotation. The at least one actuator is configured to rotate each of the at least two arms about the axis of rotation in the plane of rotation. Rotating the at least two arms affects the center of mass of the tilt management device. The tilt sensor outputs a measured direction of tilt. The circuitry is configured to control rotation of each of the at least two arms by the at least one actuator. The circuitry is configured to receive a desired direction of tilt and perform tilt correction by affecting the center of mass of the tilt management device. The tilt correction includes determining a position of each of the at least two arms about the axis of rotation in the plane of rotation, receiving the measured direction of tilt output from the tilt sensor, and determining a compensatory direction of tilt based on the desired direction of tilt and the measured direction of tilt. Tilt correction also includes, based on the determined compensatory direction and the determined position of each of the at least two arms, causing the at least one actuator to rotate at least one actuated arm towards the compensatory direction. Each of the at least one actuated arm comprise one of the at least two arms.

Alternatively or additionally, the at least one actuated arm includes at least two actuated arms and the circuitry causes the at least one actuator to rotate the at least two actuated arms towards the compensatory direction.

Alternatively or additionally, the at least two actuated arms are rotated in opposite directions about the axis of rotation towards the compensatory direction.

Alternatively or additionally, the circuitry is further configured to modulate movement of the at least two actuated arms, such that angular momentum caused by movement of the at least two actuated arms is less than a defined threshold.

Alternatively or additionally, the modulation of the angular momentum is performed by controlling at least one of angular velocity of the at least two actuated arms, angular acceleration of the at least two actuated arms, the number of actuated arms, or a direction of rotation of each of the at least two actuated arms.

Alternatively or additionally, for each of the at least one actuated arm, rotational distance defines an angle between a position of the actuated arm and the compensatory direction and an original rotational distance comprises the rotational distance of the actuated arm when rotating the at least one actuated arm towards the compensatory direction begins during the performance of tilt correction. The performance of tilt correction is restarted when any of the at least one actuated arm reaches a position located at a predefined portion of the original rotational distance for the actuated arm.

Alternatively or additionally, the performance of tilt correction is restarted at a predetermined frequency.

Alternatively or additionally, the measured direction of tilt and the desired direction of tilt are defined relative to a plane perpendicular to a vector of gravitational force.

Alternatively or additionally, the desired direction of tilt is determined based on at least one of a velocity of the tilt management device, a terrain that the tilt management device is traveling on, a default setting, or a supplied value.

Alternatively or additionally, the position of each of the at least two arms is determined by a sensor configured to measure the position of each of the at least two arms.

Alternatively or additionally, the compensatory direction of tilt is determined based on an angle from the desired direction of tilt to the measured direction of tilt.

Alternatively or additionally, an angle from the desired direction of tilt to the compensatory direction of tilt is equal to a negative of the angle from the desired direction of tilt to the measured direction of tilt.

Alternatively or additionally, the desired direction of tilt is no tilt and the compensatory direction is determined to point in the opposite of the direction of tilt.

Alternatively or additionally, the plane of rotation for each of the at least two arms are located in different positions along the axis of rotation.

Alternatively or additionally, the tilt sensor is additionally configured to output a magnitude of tilt measured relative to a vector of gravitational force. The measured magnitude of tilt comprises at least one of an angle between the axis of rotation and the vector of gravitational force, angular velocity, or angular acceleration. The performance of tilt correction additionally includes receiving a desired magnitude of tilt.

Alternatively or additionally, at least one of: a number of the at least one actuated arm, a selection of the at least one actuated arm, or a rotational speed of the at least one actuated arm is determined based on the outputted magnitude of tilt.

Alternatively or additionally, a larger outputted magnitude of tilt results in an increase in the number of the at least one actuated arm and/or an increase in a sum of the rotation speed for the at least one actuated arm.

According to another aspect, there is provided a method for controlling a tilt of a device including at least two arms, at least one actuator, and a tilt sensor. The method includes receiving a desired tilt and determining a position of each of the at least two arms. Each of the at least two arms is configured to rotate about an axis of rotation in a plane of rotation. The method also includes receiving a measured direction of tilt output from the tilt sensor and determining a compensatory direction of tilt based on the desired direction of tilt and the measured direction of tilt. Based on the determined compensatory direction and the determined position of each of the at least two arms, the method includes causing the at least one actuator to rotate at least one actuated arm towards the compensatory direction. Each of the at least one actuated arm comprise one of the at least two arms. The at least one actuator is configured to rotate each of the at least two arms about the axis of rotation in a plane of rotation perpendicular to the axis of rotation. Rotating the at least two arms affects a center of mass of the tilt management device.

Alternatively or additionally, the at least one actuated arm comprises at least two actuated arms. The at least two actuated arms are rotated towards the compensatory direction. Movement of the at least two actuated arms is modulated, such that angular momentum caused by movement of the at least two actuated arms is less than a defined threshold. The modulation of the angular momentum is performed by controlling at least one angular velocity of the at least two actuated arms, angular acceleration of the at least two actuated arms, the number of actuated arms, or a direction of rotation of the at least two actuated arms.

Alternatively or additionally, for each of the at least one actuated arm: rotational distance defines an angle between a position of the actuated arm and the compensatory direction and an original rotational distance comprises the rotational distance of the actuated arm when rotating the at least one actuated arm towards the compensatory direction begins. The method is restarted when any of the at least one actuated arm reaches a position located at a predefined portion of the original rotational distance for the actuated arm.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

DETAILED DESCRIPTION

The present invention provides a tilt management device configured to perform tilt correction. The device measures a direction of tilt using a tilt sensor. Circuitry rotates connected arms to compensate for the measured tilt by modulating a center of mass of the device.

Figure 1A:
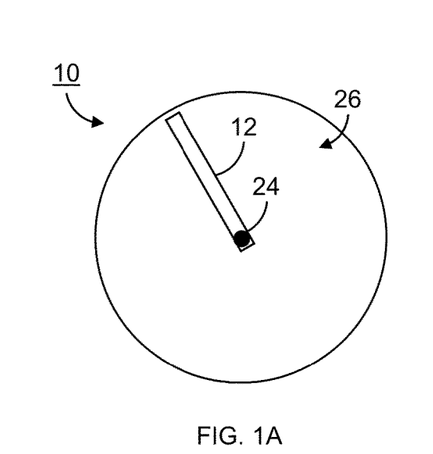
FIGS. 1A-1D are a schematic views of an exemplary tilt management device according to the invention
Figure 1B:
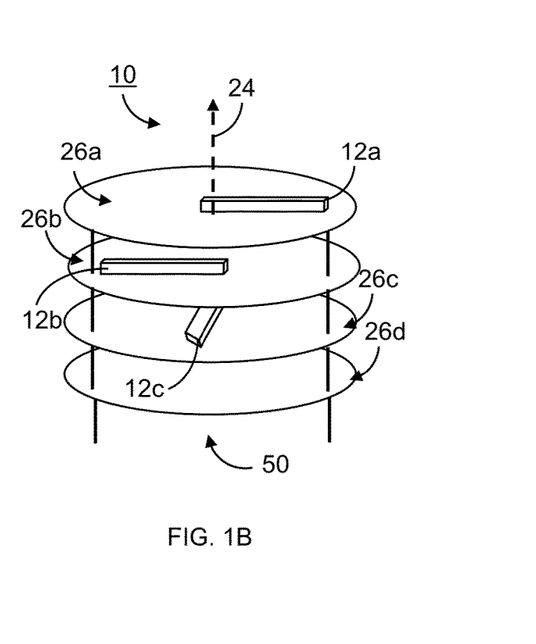
Figure 1C:
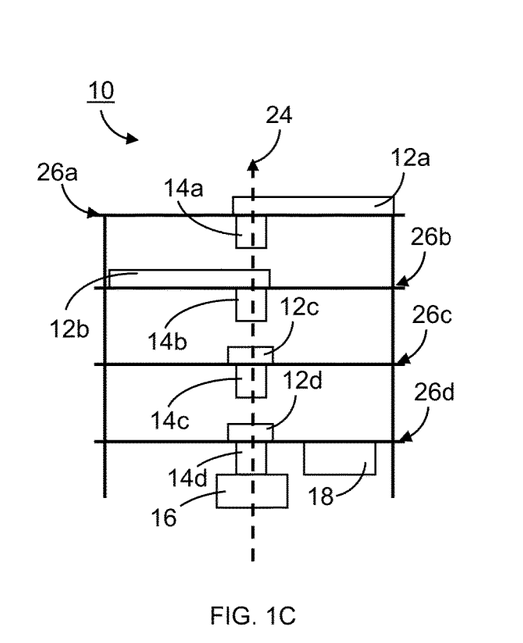
Figure 1D:
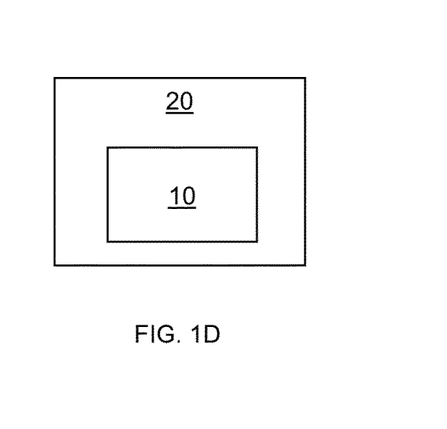

Turning to FIGS. 1A-D and 2, an exemplary tilt management device 10 according to the invention includes at least one arm 12, at least one actuator 14, a tilt sensor 16, and circuitry 18. As shown in FIG. 1D, the tilt management device 10 may be included as part of an external device 20 (e.g., a robot). For example, the tilt management device 10 may be a component that is added to an existing external device 20 to improve the balance of the external device.

The actuator(s) rotate each of the arms 12 about an axis of rotation 24 in a plane of rotation 26. FIG. 1A is a top view of the tilt management device 10 and depicts one of the arms 12 and the plane of rotation 26. As shown in FIGS. 1B and 10 (a perspective and side view respectively of the tilt management device 10 of FIG. 1A), the arms may be located in separate planes of rotation 26 along the axis of rotation 24. Rotating the arms 12 to different positions affects the center of mass of the tilt management device 10. In this way, by controlling the position of the arms 12, the balance or tilt of the tilt management device 10 (and external device 20) can be controlled.

The actuator(s) 14 may comprise any device capable of rotating the arms 12 about the axis of rotation 24. For example, the actuator(s) 14 may comprise an electric motor, a servo motor, or a hydraulic motor. The actuator(s) 14 may comprise a separate actuator for each of the arms 12. Alternatively, a given actuator 14 may rotate more than one arm 12.

The tilt management device 10 includes at least one arm 12. In a preferred embodiment, the tilt management device 10 includes at least two arms 12. The arms 12 may comprise any structure capable of being rotated about the axis of rotation 24. For example, the arm 12 may comprise a rod like structure connected at a proximal end to the actuator 14. The arm 12 may have a support (e.g., a wheel) located at the distal end of the arm 12. Each of the arms 12 may have a known mass. For example, the arms 12 may all have approximately the same mass (e.g., within 5% or 10%). Alternatively, the arms may have different masses. For example, arms located closer to a base 50 of the tilt management device 10 may have a larger mass than arms located further from the base 50. This allows the arms further from the base 50 to move faster, react more quickly, and have a greater effect on tilt. As shown in FIG. 1B and 10, each arm 12 may be located on a separate rotational plane 26. While not required, each of the arms 12 may have the same length (e.g., within 5%).

The circuitry 18 controls rotation of the arms 12 by the actuator(s) 14 to perform tilt correction. That is, the circuitry 18 affects the center of mass of the tilt management device 10 by controlling rotation of the arms 12. The circuitry 18 performs tilt correction based on a received desired direction of tilt 34, a measured direction of tilt 30, and a determined position of each of the arms 12 about the axis of rotation 24 in the plane of rotation 26. The measured direction of tilt 30 is output by the tilt sensor 16.

The tilt sensor 16 measures a direction of tilt of the tilt management device 10. As will be understood by one of ordinary skill in the art, the tilt sensor 16 may comprise any suitable device for measuring tilt angle. Tilt angle refers to an angle of inclination relative to gravity. The tilt sensor 16 may measure tilt in one or more axes.

The tilt sensor may comprise an accelerometer (e.g., a three-axis accelerometer), inclinometer, a gyrosensor, or any other suitable sensor. One or more tilt sensors may be located at strategic locations in the tilt management device or outside the tilt management device in/on the external device 10. The magnitude and direction of tilt may be provided as Cartesian coordinates. An example of a suitable device is a SCA100T dual axis inclinometer available from muRata of Kyoto, Japan. Another suitable device is a low-g MEMS (micro-electromechanical system) accelerometer such as a LIS302DL tri-axis digital accelerometer, available from STMicroelectronics of Geneva, Switzerland and a gyroscope such as a model ADIS16350 High Precision Tri-Axis Inertial Sensor from Analog Devices, Inc.

The circuitry 18 determines a compensatory direction of tilt 32 based on the desired direction of tilt 34 and the measured direction of tilt 30. Based on the determined compensatory direction 32 and the determined position of each of the arms, the circuitry 18 causes the actuator(s) 14 to rotate at least one actuated arm 12 towards the compensatory direction 32.

Figure 2:
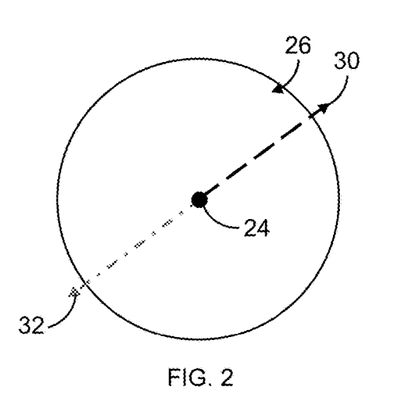
FIG. 2 is an exemplary diagram of a measured direction of tilt and a compensatory direction of tilt in a plane of rotation according to the invention.
Figure 3:
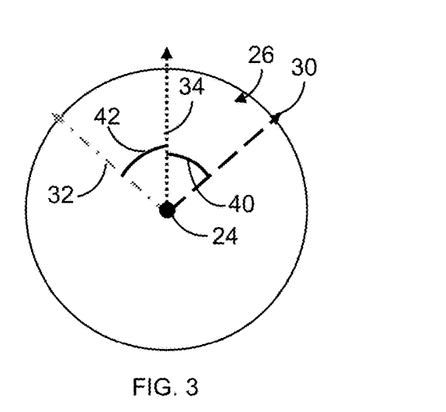
FIG. 3 is another exemplary diagram of a measured direction of tilt, a desired direction of tilt, and a compensatory direction of tilt in a plane of rotation according to the invention.

For example, FIGS. 2 and 3 depict the determination of the compensatory direction of tilt 32. In FIG. 2, no tilt is desired so there is no designed direction of tilt 34 shown. When the desired direction of tilt is no tilt, the compensatory direction 32 may be determined to point in the opposite of the direction of tilt 30.

A setting of no tilt may be most common when traversing level terrain and/or when traveling at a lower speed (lower speed may be defined based on the configuration of the external device 20). The desired direction of tilt may be determined based on varying criteria. For example, the desired direction of tilt 32 may be determined based on at least one of a velocity of the tilt management device, a terrain that the tilt management device is traveling on, a default setting, or a supplied value. The terrain traveling on may be determined based on measurements output by the tilt sensor 16 (e.g., angle of inclination, rate of change of measured direction and magnitude of tilt, etc.) or an output of an additional sensor (e.g., an accelerometer measuring jostling of the tilt management device 10).

In FIG. 3, a desired direction of tilt 34 is shown. The compensatory direction of tilt 32 is determined based on an angle 40 from the desired direction of tilt 34 to the measured direction of tilt 30. For example, an angle 42 between the desired direction of tilt 34 to the compensatory direction of tilt 32 may be equal to a negative of the angle 40 between the desired direction of tilt 34 and the measured direction of tilt 30.

The measured direction of tilt 30 and the desired direction of tilt 34 are defined relative to a plane perpendicular to a vector of gravitational force.

The tilt sensor 16 may additionally output a magnitude of tilt measured relative to a vector of gravitational force. The measured magnitude of tilt may include at least one of an angle between the axis of rotation and the vector of gravitational force, angular velocity, or angular acceleration. Performing tilt correction may additionally include receiving a desired magnitude of tilt. For example, the desired magnitude of tilt may indicate an angle of 10 degrees relative to gravity, indicating that the tilt management device 10 is leaning slightly towards the desired direction of tilt 34.

The number of arms 12 actuated by the circuitry 18 during tilt correction may preferably be at least two. The circuitry 18 may reduce the angular momentum experienced by the tilt management device 10 based on how the actuator(s) 16 rotate the actuated arms 12 towards the compensatory direction 32. For example, the circuitry 18 may rotate the actuated arms 12 in opposite directions about the axis of rotation 24 towards the compensatory direction 32.

The circuitry may also modulate movement of the actuated arms 12, such that angular momentum caused by movement of the at least two actuated arms is less than a defined threshold (e.g., less than 5 kg m$^2$/sec, 10 kg m$^2$/sec, or 20 kg m$^2$/sec). Modulation of the angular momentum may be performed by controlling at least one of angular velocity of the actuated arms 12, angular acceleration of the actuated arms 12, the number of arms 12 being rotated, or a direction of rotation of each of the actuated arms 12.

As will be understood by one of ordinary skill in the art, the circuitry 18 may have various implementations. For example, the circuitry 18 may include any suitable device, such as a processor (e.g., CPU), programmable circuit, integrated circuit, memory and I/O circuits, an application specific integrated circuit, microcontroller, complex programmable logic device, other programmable circuits, or the like. The circuitry 18 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the circuitry 18. The circuitry 18 may also include a communication interface for receiving and transmitting data (e.g., between the tilt management device 10 and the external device 20). For example, the communication interface may be used to receive the desired tilt direction, desired tilt magnitude, and other variables (e.g., thresholds) described herein.

Figure 4A:
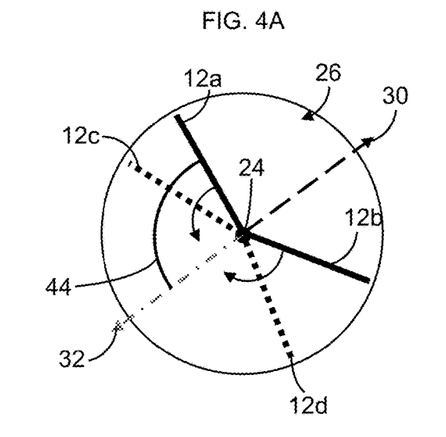
FIGS. 4A-4D are exemplary diagrams of tilt correction performed using the measured direction of tilt and the compensatory direction of tilt of FIG. 2.

Turning to FIG. 4A, movement of the arms 12 is depicted. While the arms 12 are shown relative to a plane of rotation 26, the arms 12 may be located in different planes to prevent interference of the arms 12 with one another during movement. For example, the plane of rotation 26 for each of the arms 12 may be located in different positions along the axis of rotation 24. But, the invention is not limited to each arm rotating in a separate plane. For example, one or more arms 12 may rotate in the same plane of rotation 26.

Each plane of rotation 26 may be a physical plane that at least one of the arms 12 rests on for support. For example, each arm 12 may include a wheel located at a distal end of the arm 12 opposite the axis of rotation. The wheel may rest on a corresponding plane for support. For more stability, each arm 12 may be located between two opposing plates and each arm may include two wheels that press against the two opposing plates (i.e., each wheel pushes against one of the plates). The wheels may be vertically aligned to reduce twisting of the arm. Alternatively, each plane of rotation 26 may be for illustrative purposes only and each arm 12 may rotate freely through space (e.g., only connected to the actuator 14 at a proximal end of the arm 12 located at or near the axis of rotation 24. For example, the actuator(s) 14 may be aligned along the axis of rotation 24 (e.g., as concentric telescoping columns).

For each of the actuated arms 12, rotational distance 44 defines an angle between a position of the actuated arm 12 and the compensatory direction 32. An original rotational distance is the rotational distance of the actuated arm 12 before the actuated arm 12 is rotated towards the compensatory direction 32 during tilt correction. The position of each of the arms may be determined by a sensor configured to measure the position of each of the at least two arms. For example, the sensor may comprise a rotary encoder (e.g., magnetic, optical, or mechanical). Alternatively or additionally, the position of each of the arms may be determined based on feedback built into the actuator 14.

During tilt correction, the performance of tilt correction may be restarted when any of the actuated arm(s) 12 reaches a position located at a predefined portion of the original rotational distance for the actuated arm 12. For example, tilt correction may be restarted when the actuated arm(s) 12 reach a position halfway between the original position of the actuated arm(s) 12 and the compensatory direction 32.

Alternatively, tilt correction may be restarted after a given period of time (e.g., 50 milliseconds, 100 milliseconds, 200 milliseconds, 0.5 seconds, 1 second, 2 seconds, 5 seconds, etc.). That is, performing tilt correction may be restarted at a predetermined frequency. For example, the measured direction of tilt and magnitude of tilt may be measured every second. If the difference between the measured magnitude of tilt and the desired magnitude of tilt is greater than a given threshold, then tilt correction may be performed. As an example, if the measured magnitude of tilt indicates that tilt correction should be performed (i.e., the magnitude of tilt is greater than a given threshold), then the compensatory direction is determined and the actuated arms are rotated. One second later, a measured direction and magnitude of tilt are again received and a decision is made regarding whether tilt correction should be performed. If tilt correction should be performed (i.e., the magnitude of tilt is greater than a given threshold), then a new compensatory direction is determined and the actuated arms are again rotated.

In FIG. 4A, the desired direction of tilt 34 is no tilt. For this reason, the compensatory direction 32 of tilt is directly opposite the measured direction of tilt 30. In this example, the two arms 12a, 12b furthest from the compensatory direction 32 are selected to be the actuated arms 12a, 12b. The actuated arms 12a, 12b are represented using solid lines, while the other arms (i.e., the arms not being rotated) are shown using dashed lines. While the two arms 12a, 12b furthest from the compensatory direction 32 are rotated in this example, any criteria may be used to select the actuated arms. For example, the actuated arm(s) may be selected as the arm(s) closest to the compensatory direction 32.

The two actuated arms 12a, 12b are rotated (in opposite directions) towards the compensatory direction 32 as represented by the rotation arrows. In this example, the actuated arms 12a, 12b are rotated until they reach a position halfway between the compensatory direction of tilt 32 and the original position of the actuated arms 12a, 12b. Alternatively, the arms 12a, 12b may be rotated for a prescribed period of time (e.g., 1 second).

Figure 4B:
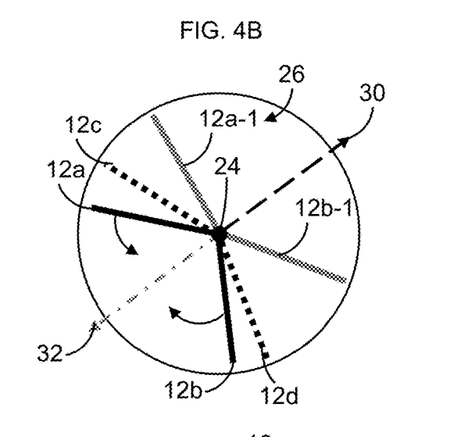

In FIG. 4B, the actuated arms 12a, 12b have moved from their original position in FIG. 4A (represented by gray lines 12a-1 and 12b-1) to a position approximately halfway between their original position and the compensatory direction 32. At this point, tilt correction is restarted and the tilt direction 30 is measured again and a new compensatory direction 32 is determined. In FIG. 4B, the compensatory direction 32 and measured direction of tilt 30 have not changed. The magnitude of each has presumably changed to smaller values due to performing tilt correction. Because the actuated arms 12a, 12b were already moved (and may still be moving), tilt correction may be continued using the same actuated arms 12a, 12b. But, the other arms 12c, 12d could additionally or alternatively be selected as actuated arms 12. As in FIG. 4A, the actuated arms 12a, 12b are again moved towards the compensatory direction 32 as represented by the rotation arrows.

Figure 4C:
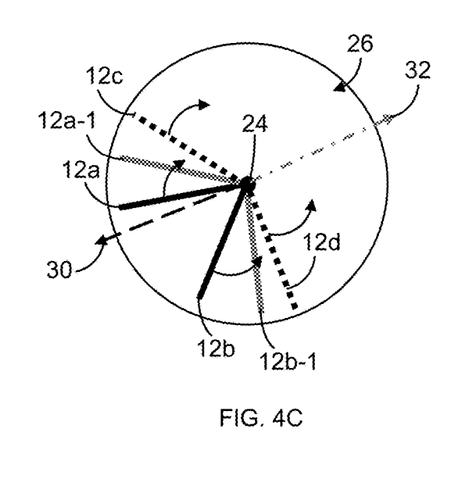

In FIG. 4C, the actuated arms 12a, 12b have moved from their previous position in FIG. 4B (represented by gray lines 12a-1, 12b-a) to a new position located halfway between their previous position in FIG. 4B and the compensatory direction 32. Tilt correction is again restarted and a new direction of tilt 30 is measured and a compensatory direction of tilt 32 is determined. In this example, tilt correction has overcorrected the tilt of the tilt management device 10 and the tilt management device 10 is now leaning towards the opposite direction as at the start of tilt correction shown in FIG. 4A.

With continued reference to FIG. 4C, all four of the arms 12a-12d are selected as actuated arms 12 (i.e., are rotated by the actuator(s) 14). The actuated arms 12a-12d are again rotated towards the determined compensatory direction 32 as represented by the rotation arrows.

Figure 4D:
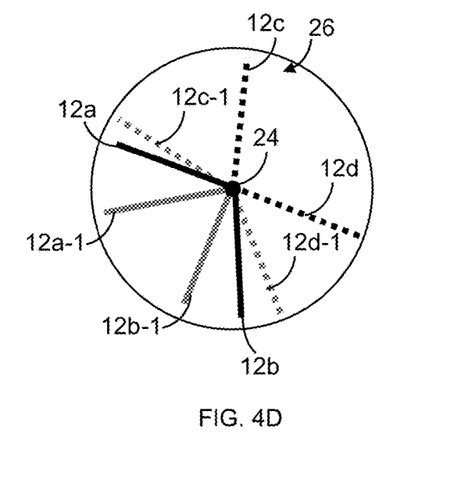

In FIG. 4D, the actuated arms 12a-12d have rotated from their previous positions in FIG. 4C (represented by gray lines 12a-1, 12b-1, 12c-1, 12d-1) to a new position located halfway between their previous position in FIG. 4C and the compensatory direction 32. Tilt correction is again restarted and the direction of tilt 30 is measured. In this example, the tilt sensor 16 outputs that the tilt management device 10 is not tilting (i.e., the tilt management device 10 is balanced) and tilt correction is stopped.

During tilt correction, at least one of: a number of actuated arm(s), a selection of the actuated arm(s), or a rotational speed of the actuated arm(s) may be determined based on the outputted magnitude of tilt. For example, a larger outputted magnitude of tilt may result in an increase in the number of actuated arm(s) and/or an increase in a sum of the rotation speed of the actuated arm(s). The sum of the rotation speed of the actuated arm(s) is the total combined speed of all of the actuated arm(s) with regards for direction.

Figure 5:
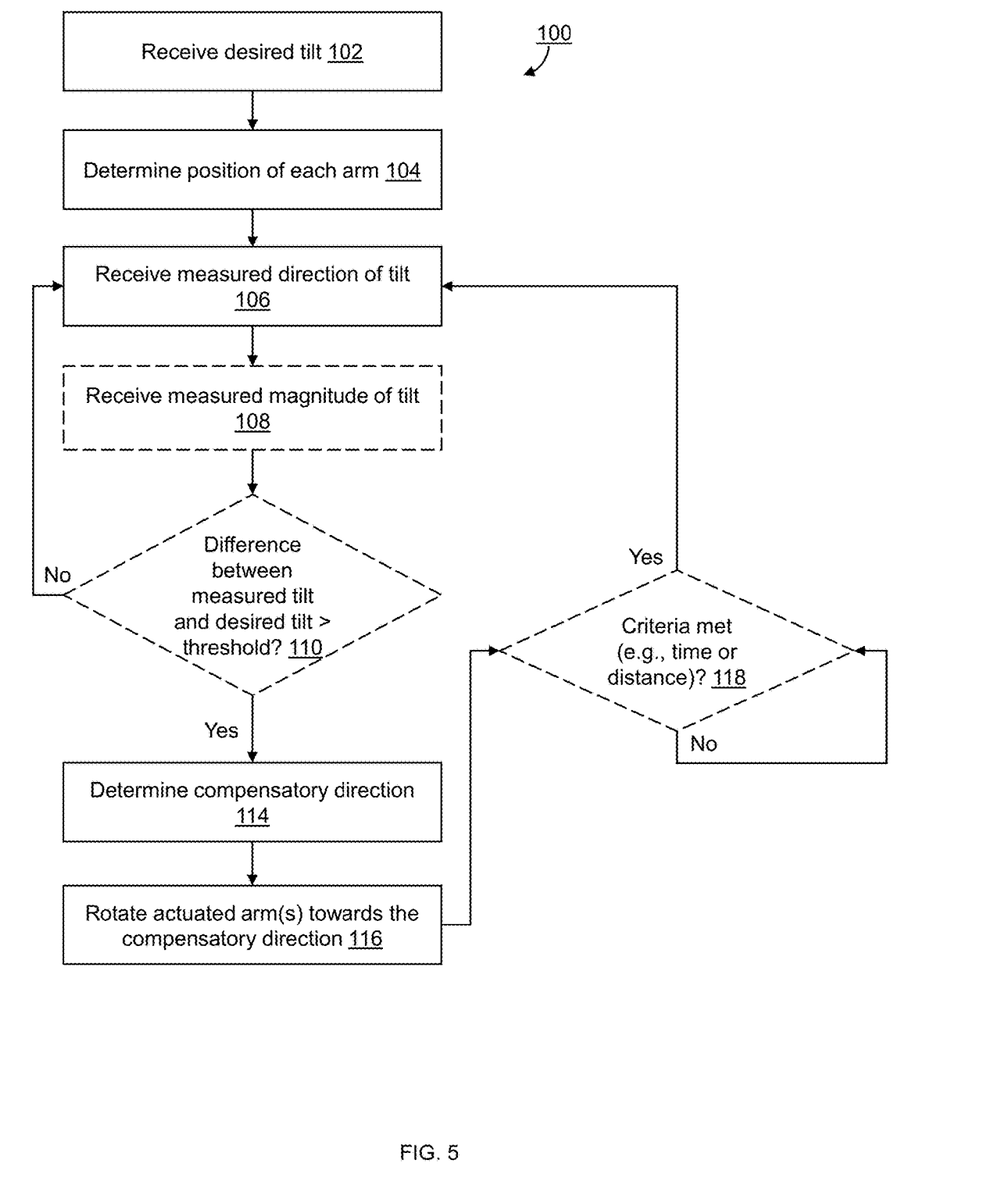
FIG. 5 is an exemplary flow diagram of a method for controlling tilt of a device according to the invention.

Turning to FIG. 5, a method 100 for controlling the tilt of a device 10 is shown. The method 100 may be performed by the circuitry 18. In process block 102, a desired tilt 34 is received. As described above, the desired tilt 34 may be no tilt. For example, not receiving a desired tilt 34 may be interpreted as received a desired tilt 34 of no tilt.

In process block 104, a position of each arm 12 is determined. As described above, the position of each arm 12 may be determined using a sensor or feedback of the actuator(s). The position of each arm 12 may also be estimated based on a previous sensor reading and a movement of each arm 12 since the previous sensor reading.

In process block 106, a measured direction of tilt 30 is received. In optional process block 108, the measured magnitude of tilt is received. In optional decision block 110, a check is performed to determine if the difference between the desired tilt and the measured tilt is greater than a threshold. If the difference between the desired tilt and the measured tilt is less than or equal to the threshold, processing returns to processing block 106. Otherwise, processing moves to processing block 114.

The difference between the desired tilt and the measured tilt may take into account both the magnitude and direction of tilt, only the magnitude of tilt, or only the direction of tilt. For example, the desired direction of tilt and the desired magnitude of tilt may together define a point on a surface of a sphere. The measured direction of tilt and the measured magnitude of tilt may also together define a point on the surface of the sphere. The orthodromic distance between these two points may be used to describe the difference between the measured tilt and the desired tilt. In another example, the difference between the measured and desired tilt may comprise the angle between the desired direction of tilt and the measured direction of tilt. In a further example, the difference between the measured and desired tilt may comprise the absolute value of the difference between the desired magnitude of tilt and the measured magnitude of tilt. The difference between the measured and desired tilt is not limited to the provided examples, but may comprise any suitable method for comparing the desired tilt and the measured tilt. The threshold in decision block 110 may be any suitable value and may be received or determined based on a default value.

In processing block 114, a compensatory direction of tilt 32 is determined based on the desired direction of tilt 34 and the measured direction of tilt 30. One or more of the optional blocks 108, 110 may not be present, such that processing moves directly from processing block 106 to processing block 114.

In processing block 116, the actuator(s) rotate the actuated arm(s) towards the compensatory direction based on the determined compensatory direction and the determined position of the arm(s). In optional decision block 118, a check is performed to determine if a criteria for restarting tilt correction has been reach. For example, the criteria may be that the actuated arm(s) has completed movement towards the compensatory direction (e.g., movement half way towards the compensatory direction from a starting position). Alternatively or additionally, the criteria may be that a given period of time has elapsed since beginning tilt correction. Once the criteria has been met, processing moves back to process block 106.

Figure 6:
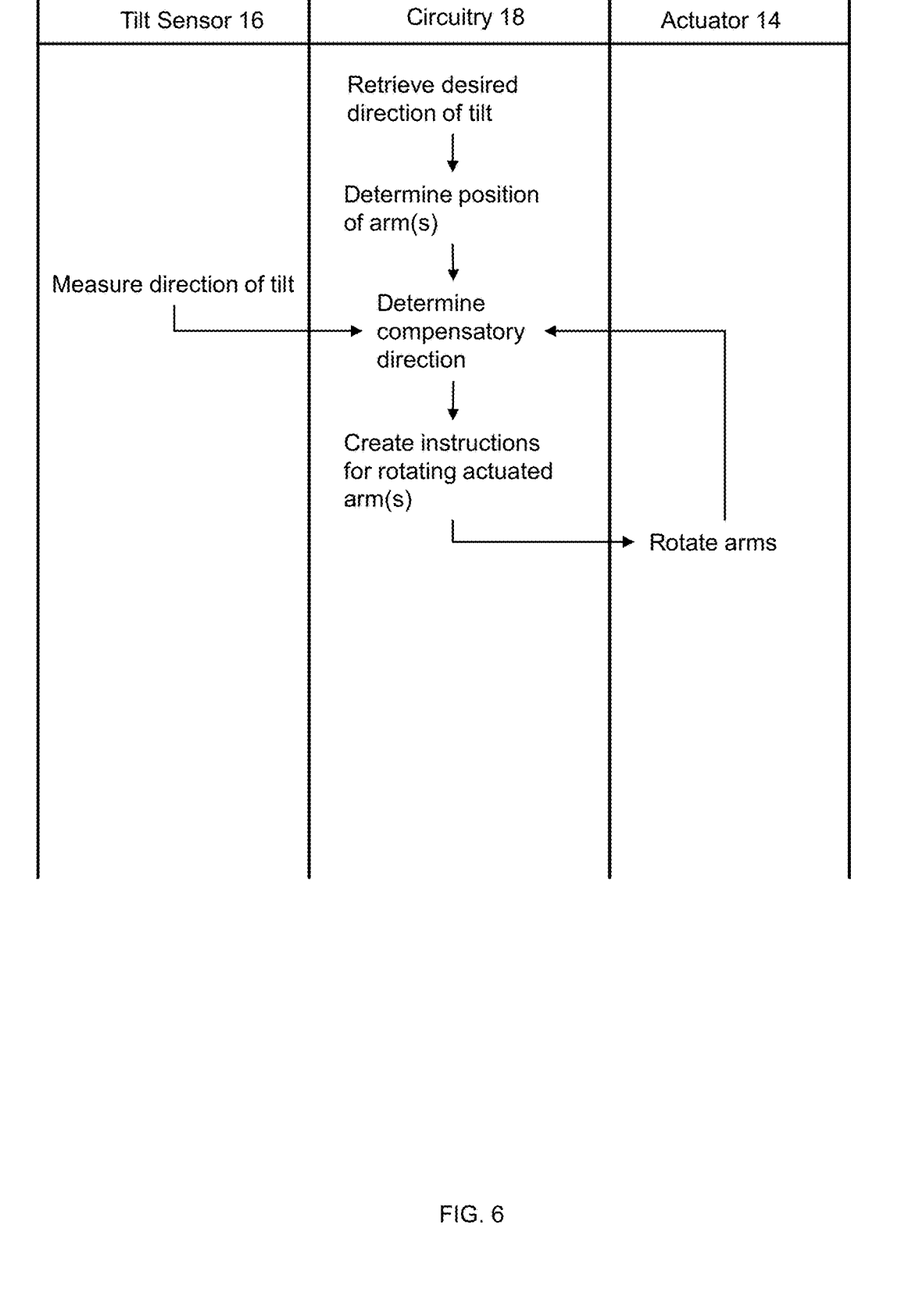
FIG. 6 is an exemplary ladder diagram depicting the transfer of data between a tilt sensor, circuitry, and actuator according to the invention.

Turning to FIG. 6, performance of tilt correction is shown in a ladder diagram. As described above, the circuitry 18 retrieves a desired direction of tilt and determines positions of the arms 12. For example, the circuitry 18 may determine the position of the arms 12 based on the output from a sensor. The circuitry 18 determines a compensatory direction 32 based on the measured direction of tilt 30 and the desired direction of tilt 34. Based on the position of the arms and the determined compensatory direction, the circuitry 18 creates instructions for rotating the actuated arms. These instructions are provided to the actuators and the actuator rotates the actuated arm(s).

As described above, the tilt management device 10 may be included in an external device 20. The external device may include a robot (e.g., two legged, four legged, wheeled, etc.), a personal transport device (e.g., a self-balancing two wheeled vehicle) or any suitable device. The external device 20 may include additional methods for compensating for tilt in addition to the tilt management device 10. For example, the external device 20 may be a four legged robot that is programmed to move its legs to compensate for loss of balance. The tilt management device 10 may be included in the external device 20 to improve the balance of the four legged robot. The tilt management device 10 may be used in this example to rebalance the robot to allow the robot time to move its legs to correct balance. For example, the tilt management device 10 may improve the balance of the robot while moving (i.e., walking) such that the robot has enough time to reposition its legs before the robot falls.

All ranges and ratio limits disclosed in the specification and claims may be combined in any manner. Unless specifically stated otherwise, references to "a," "an," and/or "the" may include one or more than one, and that reference to an item in the singular may also include the item in the plural.

The transitional words or phrases, such as "comprising," "including," "carrying," "having," "containing," "involving," "holding," and the like, are open-ended, i.e., meaning including but not limited to.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A tilt management device having a center of mass comprising:
   at least two arms configured to rotate about an axis of rotation in a plane of rotation, wherein the plane of rotation is horizontal when the axis of rotation is parallel to a direction of gravity;
   at least one actuator configured to rotate each of the at least two arms about the axis of rotation in the plane of rotation, wherein rotating the at least two arms affects the center of mass of the tilt management device;
   a tilt sensor configured to output a measured direction of tilt; and
   circuitry configured to control rotation of each of the at least two arms by the at least one actuator, wherein the circuitry is configured to:
      receive a desired direction of tilt;
      perform tilt correction by affecting the center of mass of the tilt management device, the tilt correction comprising:
         determine a position of each of the at least two arms about the axis of rotation in the plane of rotation;
         receiving the measured direction of tilt output from the tilt sensor;
         determining a compensatory direction of tilt based on the desired direction of tilt and the measured direction of tilt; and based on the determined compensatory direction and the determined position of each of the at least two arms, causing the at least one actuator to rotate at least one actuated arm towards the compensatory direction, wherein each of the at least one actuated arm comprise one of the at least two arms.

2. The tilt management device of claim 1, wherein:
for each of the at least one actuated arm:
rotational distance defines an angle between a position of the actuated arm and the compensatory direction; and
an original rotational distance comprises the rotational distance of the actuated arm when rotating the at least one actuated arm towards the compensatory direction begins during the performance of tilt correction;
the performance of tilt correction is restarted when any of the at least one actuated arm reaches a position located at a predefined portion of the original rotational distance for the actuated arm.

3. The tilt management device of claim 1, wherein the performance of tilt correction is restarted at a predetermined frequency.

4. The tilt management device of claim 1, wherein the measured direction of tilt and the desired direction of tilt are defined relative to a plane perpendicular to a vector of gravitational force.

5. The tilt management device of claim 1, wherein the desired direction of tilt is determined based on at least one of:
a velocity of the tilt management device, a terrain that the tilt management device is traveling on, a default setting, or a supplied value.

6. The tilt management device of claim 1, wherein the position of each of the at least two arms is determined by a sensor configured to measure the position of each of the at least two arms.

7. The tilt management device of claim 1, wherein the compensatory direction of tilt is determined based on an angle from the desired direction of tilt to the measured direction of tilt.

8. The tilt management device of claim 7, wherein an angle from the desired direction of tilt to the compensatory direction of tilt is equal to a negative of the angle from the desired direction of tilt to the measured direction of tilt.

9. The tilt management device of claim 1, wherein the desired direction of tilt is no tilt and the compensatory direction is determined to point in the opposite of the direction of tilt.

10. The tilt management device of claim 1, wherein the plane of rotation for each of the at least two arms are located in different positions along the axis of rotation.

11. The tilt management device of claim 10, wherein at least one of: a number of the at least one actuated arm, a selection of the at least one actuated arm, or a rotational speed of the at least one actuated arm is determined based on the outputted magnitude of tilt.

12. The tilt management device of claim 1, wherein:
the tilt sensor is additionally configured to output a magnitude of tilt measured relative to a vector of gravitational force;
the measured magnitude of tilt comprises at least one of an angle between the axis of rotation and the vector of gravitational force, angular velocity, or angular acceleration; and
the performance of tilt correction additionally includes receiving a desired magnitude of tilt.

13. The tilt management device of claim 12, wherein a larger outputted magnitude of tilt results in an increase in the number of the at least one actuated arm and/or an increase in a sum of the rotation speed for the at least one actuated arm.

14. A tilt management device having a center of mass comprising:
at least two arms configured to rotate about an axis of rotation in a plane of rotation;
at least one actuator configured to rotate each of the at least two arms about the axis of rotation in the plane of rotation, wherein rotating the at least two arms affects the center of mass of the tilt management device;
a tilt sensor configured to output a measured direction of tilt; and
circuitry configured to control rotation of each of the at least to arms by the at least one actuator, wherein the circuitry is configured to:
receive a desired direction of tilt;
perform tilt correction by affecting the center of mass of the tilt management device, the tilt correction comprising:
determine a position of each of the at least two arms about the axis of rotation in the plane of rotation;
receiving the measured direction of tilt output from the tilt sensor;
determining a compensatory direction of tilt based on the desired direction of tilt and the measured direction of tilt; and
based on the determined compensatory direction and the determined position of each of the at least two arms, causing the at least one actuator to rotate at least one actuated arm towards the compensatory direction, wherein each of the at least one actuated arm comprise one of the at least two arms;
wherein the at least one actuated arm comprises at least two actuated arms and the circuitry causes the at least one actuator to rotate the at least two actuated arms towards the compensatory direction.

15. The tilt management device of claim 14, wherein the at least two actuated arms are rotated in opposite directions about the axis of rotation towards the compensatory direction.

16. The tilt management device of claim 14, wherein the circuitry is further configured to modulate movement of the at least two actuated arms, such that angular momentum caused by movement of the at least two actuated arms is less than a defined threshold.

17. The tilt management device of claim 16, wherein the modulation of the angular momentum is performed by controlling at least one of angular velocity of the at least two actuated arms, angular acceleration of the at least two actuated arms, the number of actuated arms, or a direction of rotation of each of the at least two actuated arms.

18. A method for controlling a tilt of a device including at least two arms, at least one actuator, and a tilt sensor, method comprising:
receive a desired tilt;
determine a position of each of the at least two arms, wherein:
each of the at least two arms is configured to rotate about an axis of rotation in a plane of rotation; and
the plane of rotation is horizontal when the axis of rotation is parallel to a direction of gravity:
receive a measured direction of tilt output from the tilt sensor;

determine a compensatory direction of tilt based on the desired direction of tilt and the measured direction of tilt; and based on the determined compensatory direction and the determined position of each of the at least two arms, cause the at Least one actuator to rotate at least one actuated arm towards the compensatory direction, wherein:
- each of the at least one actuated arm comprise one of the at least two arms;
- the at least one actuator is configured to rotate each of the at least two arms about the axis of rotation in a plane of rotation perpendicular to the axis of rotation; and
- rotating the at least two arms affects a center of mass of the tilt management device.

19. The method of claim 18, wherein:
for each of the at least one actuated arm:
- rotational distance defines an angle between a position of the actuated arm and the compensatory direction; and
- an original rotational distance comprises the rotational distance of the actuated arm when rotating the at least one actuated arm towards the compensatory direction begins;
- the method is restarted when any of the at least one actuated arm reaches a position located at a predefined portion of the original rotational distance for the actuated arm.

20. A method for controlling a tilt of a device including at least two arms, at least one actuator, and a tilt sensor, method comprising:
receive a desired tilt;
determine a position of each of the at least two arms wherein each of the at least two arms is configured to rotate about an axis of rotation in a plane of rotation;
receive a measured direction of tilt output from the tilt sensor;
determine a compensatory direction of tilt based on the desired direction of tilt and the measured direction of tilt; and
based on the determined compensatory direction and the determined position of each of the at least two arms, cause the at least one actuator to rotate at least one actuated arm towards the compensator direction, wherein:
- each of the at least one actuated arm corn rise one of the at least two arms;
- the at least one actuator is configured to rotate each of the at least two arms about the axis of rotation in a plane of rotation perpendicular to the axis of rotation; and
- rotating the at least two arms affects a center of mass of the tilt management device, wherein:
- the at least one actuated arm comprises at least two actuated arms;
- the at least two actuated arms are rotated towards the compensatory direction;
- movement of the at least two actuated arms is modulated, such that angular momentum caused by movement of the at least two actuated arms is less than a defined threshold; and
- the modulation of the angular momentum is performed by controlling at least one angular velocity of the at least two actuated arms, angular acceleration of the at least two actuated arms, the number of actuated arms, or a direction of rotation of the at least two actuated arms.

* * * * *